(12) United States Patent
Bell et al.

(10) Patent No.: US 9,898,543 B2
(45) Date of Patent: *Feb. 20, 2018

(54) BROWSER INTERACTION FOR LAZY LOADING OPERATIONS

(71) Applicant: International Business Machines Corporation, Armonk, NY (US)

(72) Inventors: Denise A. Bell, Austin, TX (US); Lisa Seacat Deluca, Baltimore, MD (US); David J. Levinson, Marietta, GA (US); Randa Salem, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 19 days.

This patent is subject to a terminal disclaimer.

(21) Appl. No.: 14/822,347

(22) Filed: Aug. 10, 2015

(65) Prior Publication Data

US 2016/0171007 A1    Jun. 16, 2016

Related U.S. Application Data

(63) Continuation of application No. 14/570,430, filed on Dec. 15, 2014.

(51) Int. Cl.
*G06F 17/30* (2006.01)
*G06F 3/0481* (2013.01)
*G06F 3/0484* (2013.01)

(52) U.S. Cl.
CPC ........ *G06F 17/3089* (2013.01); *G06F 3/0481* (2013.01); *G06F 3/04842* (2013.01); *G06F 17/30902* (2013.01)

(58) Field of Classification Search
CPC . G06F 17/3089; G06F 3/0484; G06F 3/04842
USPC ......................................................... 715/760
See application file for complete search history.

(56) References Cited

U.S. PATENT DOCUMENTS

| 9,292,321 | B2 | 3/2016 | Yun | |
| 2009/0210781 | A1* | 8/2009 | Hagerott | G06F 9/4443 715/234 |
| 2015/0046253 | A1 | 2/2015 | Finkelstein | |
| 2015/0100879 | A1 | 4/2015 | Nandagopal et al. | |

OTHER PUBLICATIONS

List of IBM Patents or Patent Applications Treated as Related; (Appendix P), Filed Aug. 10, 2015; 2 pages.
Denise A. Bell, et al., "Improved Browser Interaction for Lazy Loading Operations", U.S. Appl. No. 14/570,430, filed Dec. 14, 2015.

* cited by examiner

*Primary Examiner* — Andrea Leggett
(74) *Attorney, Agent, or Firm* — Cantor Colburn LLP; Nicholas Bowman (57) ABSTRACT

A system and method for enhancing a lazy loading operation is disclosed. The system and method, in general, retrieves a plurality of subsets of a dataset via the lazy loading operation and increments a counter for each of the plurality of subsets retrieved by the processor. Then, the system and method detects a first event that navigates away from the retrieving of the plurality of subsets and also detects a second event that navigates back to the retrieving of the plurality of subsets. Next, the system and method returns to the retrieving of the plurality of subsets in accordance with the counter in response to the detecting of the second event.

5 Claims, 5 Drawing Sheets

BROWSER INTERACTION FOR LAZY LOADING OPERATIONS

DOMESTIC PRIORITY

This application is a continuation of U.S. application Ser. No. 14/570,430, filed on Dec. 15, 2014, the disclosure of which is incorporated by reference herein in its entirety.

BACKGROUND

The disclosure relates generally to improved browser interaction for lazy loading operations, and more specifically, to utilizing a counter to identify previously loaded information to provide efficient back browsing when a browser employs lazy loading operations.

In general, lazy loading techniques, such as JQuery or Dojo lazy loading, cause a browser to load a dataset in sub-sets rather than loading the dataset on an initial browser load in its entirety. While lazy loading techniques can provide faster response times for websites and mobile applications, these techniques can be frustrating to users.

For instance, after a user has clicked on an item of the dataset and the browser has loaded corresponding sub-data, the browser must reload the dataset from the beginning when that user performs back browsing (e.g., by hitting their browser back button to return to the dataset from the corresponding sub-data). Particularly, the browser reloads each sub-set from the beginning, which forces the user to wait for the item to be reloaded when that item is not at the beginning of the dataset. This is predominantly frustrating when the dataset contains a very high number of separate sub-set loads and the item is in one of latter sub-set loads. In fact, this sort of frustration is very common for users browsing a set of data that has been lazy-loaded because those users typically will want to continue browsing where they left off rather than start all over from the beginning.

SUMMARY

According to one embodiment of the present invention, a method for enhancing a lazy loading operation comprises retrieving, by a processor, a plurality of subsets of a dataset via the lazy loading operation; incrementing, by the processor, a counter for each of the plurality of subsets retrieved by the processor; detecting, by the processor, a first event that navigates away from the retrieving of the plurality of subsets; detecting, by the processor, a second event that navigates back to the retrieving of the plurality of subsets; and returning, by the processor, to the retrieving of the plurality of subsets in accordance with the counter in response to the detecting of the second event.

According to another embodiment of the present invention, a computer program product that comprises a computer readable storage medium having program instructions for enhancing a lazy loading operation embodied therewith, the program instructions executable by a processor to cause: retrieving, by the processor, a plurality of subsets of a dataset via the lazy loading operation; incrementing, by the processor, a counter for each of the plurality of subsets retrieved by the processor; detecting, by the processor, a first event that navigates away from the retrieving of the plurality of subsets; detecting, by the processor, a second event that navigates back to the retrieving of the plurality of subsets; and returning, by the processor, to the retrieving of the plurality of subsets in accordance with the counter in response to the detecting of the second event.

According to another embodiment of the present invention, a system comprises a processor and a memory storing instructions for enhancing a lazy loading operation, the processor configured to execute the instructions to cause: retrieving a plurality of subsets of a dataset via the lazy loading operation; incrementing a counter for each of the plurality of subsets retrieved by the processor; detecting a first event that navigates away from the retrieving of the plurality of subsets; detecting a second event that navigates back to the retrieving of the plurality of subsets; and returning to the retrieving of the plurality of subsets in accordance with the counter in response to the detecting of the second event.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As indicated above, lazy loading techniques can be frustrating to users, especially when a dataset contains a very high number of separate sub-set loads. Thus, what is needed is a service to maintain an original position of the dataset.

In general, embodiments of the present invention disclosed herein may include a system, method, and/or computer program product (herein a system and further described below with respect to FIG. 5) that utilizes a counter to identify previously loaded information to provide efficient back browsing when a browser employs lazy loading operations. That is, the system maintains a load count for lazy loading to provide more control to users when they want to return to a previous location on browser-back or application-back operations. This results in an impression that the system remembered where the users have left off and doesn't require the users to do additional manual lazy loading.

Figure 1:
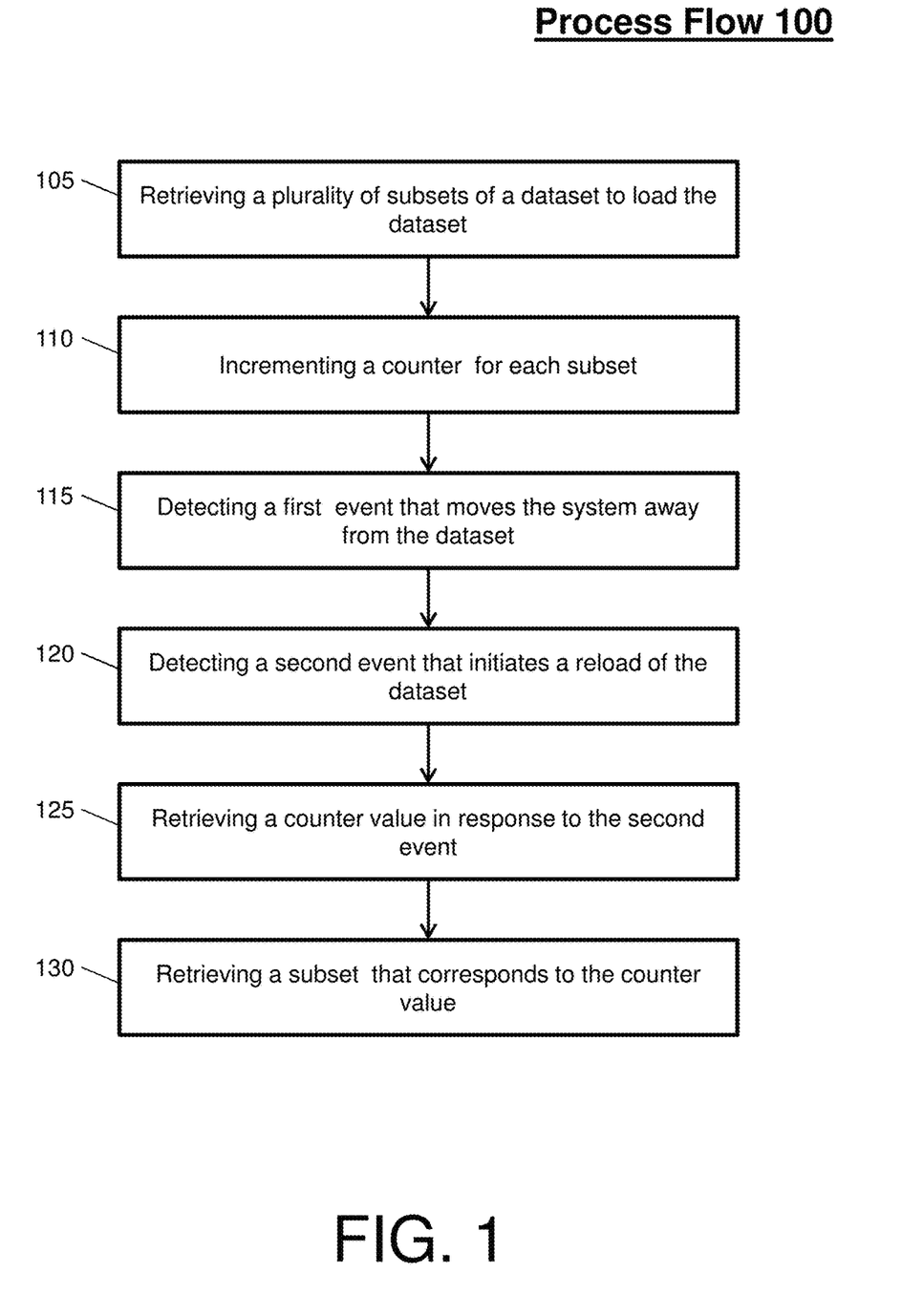
FIG. 1 illustrates a process flow according to one embodiment.

FIG. 1 illustrates a process flow 100 according to one embodiment of the system. The process flow 100 begins at block 105 when the system retrieves a plurality of subsets of a dataset to at least partially load the dataset. For instance, the system loads a webpage or mobile application that utilizes lazy loading technology and includes a first set of information. A trigger (e.g., a scrolling operation) is utilized by the system as a detection mechanism that causes the system to perform a call to retrieve and load additional information (e.g., each subsequent subset).

For example, in a social network website that utilizes lazy loading technology, a user who is viewing their friend list will see a message "load more content" in their browser once they have arrived at an end of a first sub-set of that friend list. To load each additional sub-set of that friend list, the user will have to continually scroll down. In turn, the browser will "jump" a scroll bar position as each additional sub-set comes in.

At block 110, the system increments a counter with respect to each subset that was retrieved in block 105. A value of the counter directly relates to a current position within the dataset. Continuing with the social network website example, each time the user scrolls to the bottom of the social network website to, from the user's perspective, automatically load the next set of friends, the system increments a counter. In this way, if the user has over, e.g., 600 friends in their friend list and if each sub-set presents only 10 friends, the counter will increment for each called and/or loaded sub-set of 10 friends based on the trigger or scroll operation. Thus, if a value of the counter is 0, then the current position within the dataset is the first subset (e.g., friends at position 0-9); if a value of the counter is 5, then the current position within the dataset is the sixth subset (e.g., friends at position 50-59); etc.

Then, the process flow 100 proceeds to block 115 where the system detects a first event that moves the system from the original dataset of block 105 to another dataset ('second dataset'), which may or may not correspond to the original dataset. For example, if the user chooses an element on the social network website outside of the friend list (e.g., original dataset), the system loads content corresponding to that element and not corresponding to the original dataset. Further, if the user chooses a friend (selected friend') to view from their friend list, the system can load content corresponding to selected friend (and therefore corresponding to the original dataset).

The system may, upon detection of the first event, also store the element that caused the first event, a cursor position, a scroll bar position, etc. In this way, the cursor position and the scroll bar position with respect to the element or selected friend may be stored along with the value of the counter. In addition, the first event may also cause the system to pause or stop the retrieving of a particular subset and store an indication of a progress of that retrieving. Further, the system may discard the sub-sets of the dataset that were previously loaded, may store these sub-sets in a local buffer or memory, or may cause the social network website or third party system to store these sub-sets.

Figure 2:
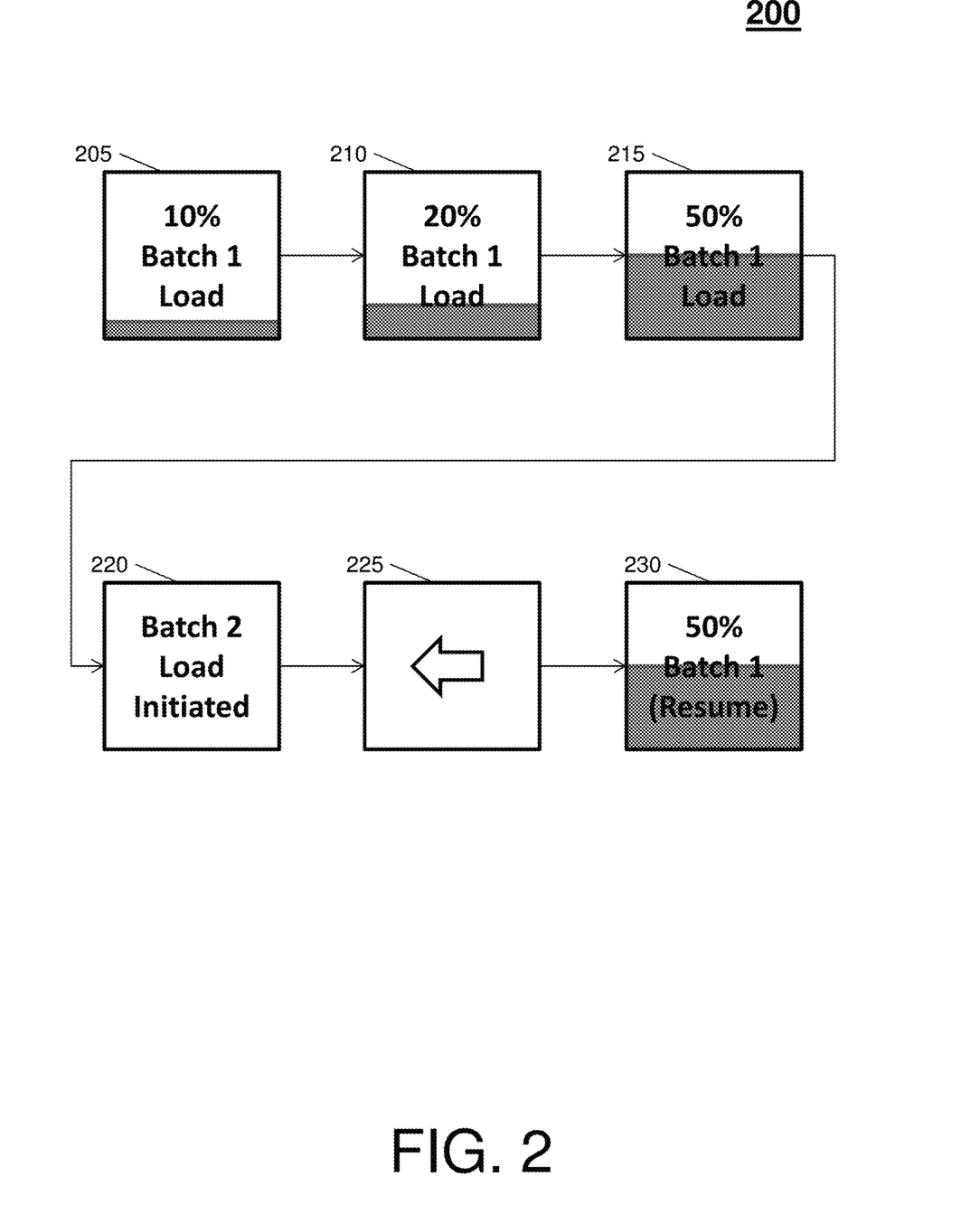
FIG. 2 illustrates a process flow of efficient back browsing according to one embodiment.

At block 120, the system detects a second event that initiates a reload of the original dataset. In general, the second event is a back browsing operation where the system returns from the other dataset to the original dataset. Examples of back browsing operation may include, but are not limited to, a back button selection, a backspace keystroke, a swipe detection, a hotkey keystroke, etc. The reload by the system includes a retrieval of a value of the counter in response to the second event, as indicated at block 125, and a retrieval of the subset that corresponds to that value, as indicated at block 130. In this way, the system may reload the original data set from the point at with the stopped, rather than reloading the entire original dataset from the beginning. FIG. 2 illustrates a process flow 200 of efficient back browsing according to one embodiment where the system reloads the original data set from the point at with the stopped.

In FIG. 2, the process flow 200 begins at block 205 where a loading status of one of the plurality of subsets of the dataset (e.g., a first batch of content or Batch 1) being retrieved by the system is at 10%. As the retrieval progresses, the load status of Batch 1 increases, as reflected in the 20% indication of block 210 and the 50% indication of block 250. During the retrieval of Batch 1, a counter is operated by the system to mark the status. When the load is at 50%, a user navigates away from Batch 1 to load a different batch of content or Batch 2, and the counter records a value to reflect that load status. Note that the user may navigate away from Batch 1 to any other batch at any time during the loading of Batch 1. Then at block 220, the Batch 2 load is initiated. At any time during the loading of Batch 2, the user can click a browser's back button (e.g., block 225), which return the system to Batch 1. At block 230, the system utilizes the value of the counter, which reflects the 50% status, to resumes loading Batch 1 50% (e.g., loading from previous point).

Returning to the social network website example, after the user has clicked the selected friend and the browser has loaded information of the selected friend (or second dataset), the browser can reload the friend list (or original data) at a position that corresponds to the selected friend in response to the user hitting their browser back button (e.g., the previously current position) rather than reloading the friend list from the first 10 friends. Thus, the browser and the operations of the social network website that utilizes lazy loading technology is improved by the system and the utilization by the system of the counter, which in turn, enables the user to avoid repeating their scrolling actions to arrive at the selected friend and spares the user of the frustrations that normally accompany such repetitive actions.

Figure 3:
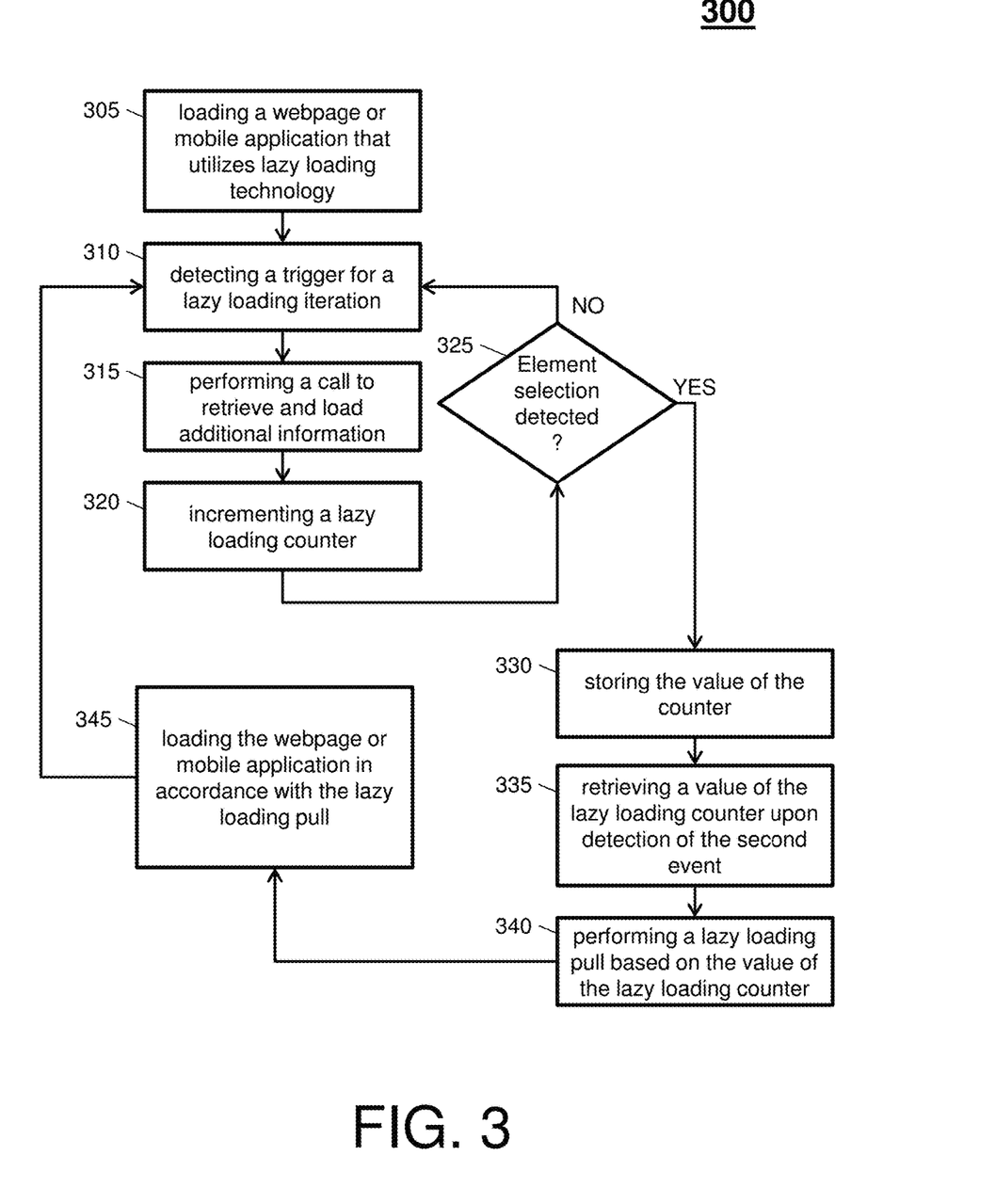
FIG. 3 illustrates a process flow according to another embodiment.

FIG. 3 illustrates a process flow 300 according to another embodiment. The process flow 300 begins at block 305, where the system loads a webpage or mobile application that utilizes lazy loading technology. This first load of the webpage or mobile application includes a first set of information. At block 310, the system detects a trigger (e.g., a scrolling operation) for the lazy loading technology. Then, at block 315, the system performs a call to retrieve and load additional information that will be added to the webpage or mobile application. At block 320, the system increments a counter (lazy loading counter') for each time the call to retrieve additional information takes place. For example, the system may initialize an integer labeled 'lazycount' to zero and may increment (e.g., lazycount++) that integer each time the trigger, the call, and/or the pull of additional information is detected. Next, the system to awaits subsequent triggers (e.g., further scrolling operations) and/or any action that will exit the process flow 300 (e.g., closing of the webpage or mobile application). Thus, the process flow 300 may loop back to block 310.

At any moment during this loop, the system can determine/detect whether any element of the webpage or mobile application was selected, as noted by decision block 325. As indicated above, if an element selection was not determined/detected, then the process flow proceeds to block 310 (e.g., as indicated by the 'NO' arrow) so that subsequent triggers for the lazy loading technology can be detected. Alternatively, if an element selection was determined/detected, then the process flow proceeds to block 330 (e.g., as indicated by the 'Yes' arrow) where the system stores a value of the lazy loading counter. The system may also store the selected element, a cursor position, a scroll bar position, etc.

The selection of the element cause the system to load subsequent information, such as a new webpage, a sub-interface of the web application, a subset of data corresponding to the selected element, etc. Once the subsequent information is loaded, this information is viewed and/or browsed. Further, at any time during the viewing and/or browsing, a second event can cause the system to repeat the first load. As indicated at block 335, the system retrieves the value of the lazy loading counter upon detection of the second event. Next, at block 340, the system performs a lazy loading pull for each count value.

The process flow 300 then proceeds to block 345 where the webpage or mobile application is loaded by the system in accordance with the lazy loading pull. Further, the lazy loading counter can be restored by the system to the value retrieved in block 335 and continually incremented if subsequent triggers for the lazy loading technology are detected (e.g., if the process flow 300 repeats).

Figure 4:
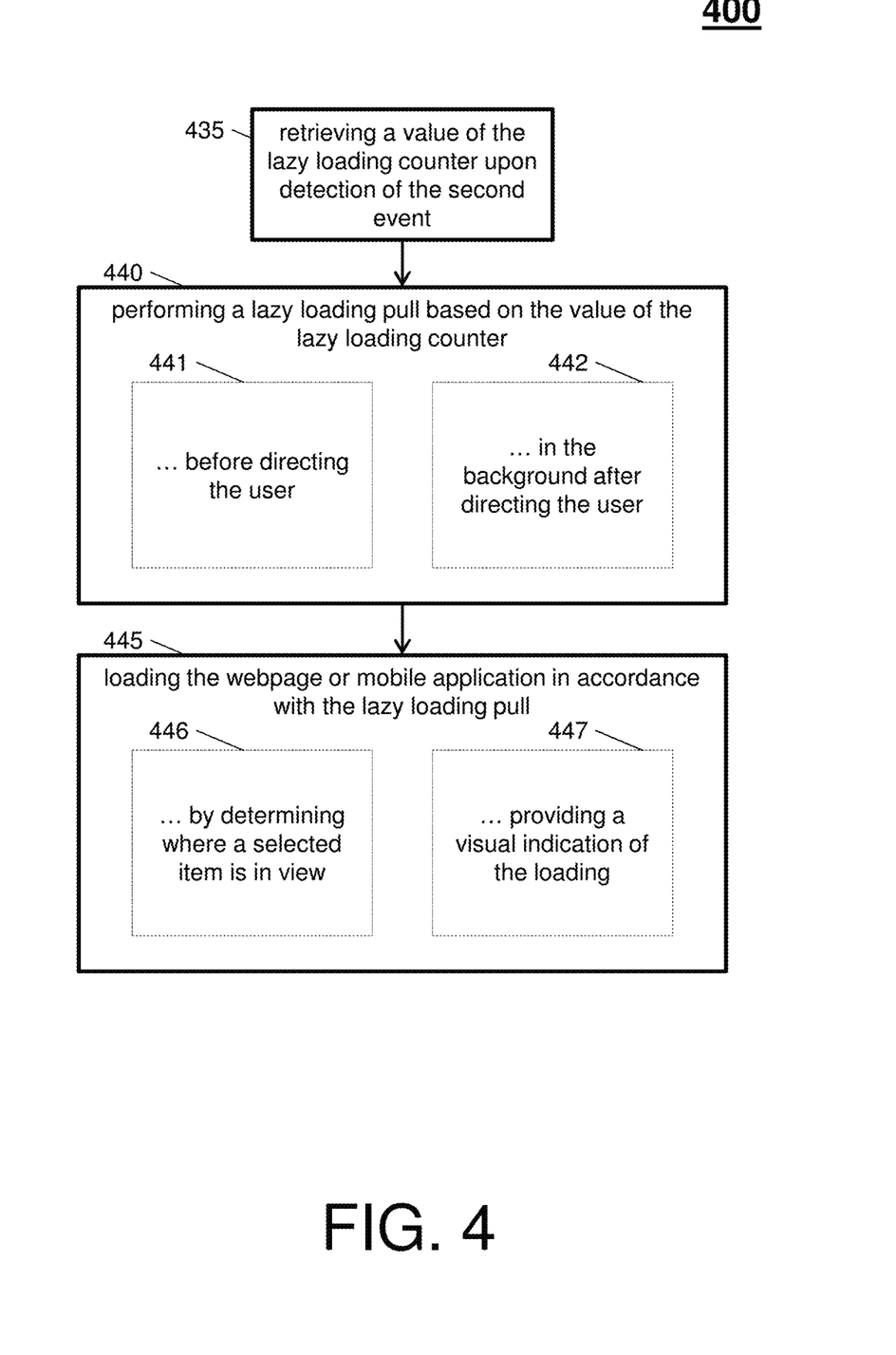
FIG. 4 illustrates a process flow according to another embodiment.

FIG. 4 illustrates a process flow according to another embodiment. The process flow 400 begins after the system determines/detects an element selection, stores a value of the counter, and loads subsequent information, such as a new webpage. Particularly, process flow 400 illustrates optional operations after a second event causes the system to repeat the first load. Thus, the process flow 400 begins at block 435, where the system retrieves a value of the lazy loading counter upon detection of the second event. Next, at block 440, the system performs a lazy loading pull for each count value. As noted by the dashed-blocks 441, 442, the system may perform the lazy loading pull before redirecting the user or in the background after the user is redirected.

The process flow 400 then proceeds to block 445 where the webpage or mobile application is loaded by the system in accordance with the lazy loading pull. As noted by the dashed-block 446, the system, if an item of information that corresponds to the element selection is also stored, can determine whether or not the item is in view during the load. If the item is not in view, the system can adjust the view until the item is present. As noted by the dashed-block 447, the system may provide a visual indication to the user that the lazy loading is occurring so that they know to wait. The visual indication may be any icon, badge, pop-up, banner, or the like that indicates an execution, a progress, etc. of the loading. In addition, the counter can be restored by the system to the value retrieved in block 435 and continually incremented if subsequent triggers for the lazy loading technology are detected.

Embodiments of the system may also reset the counter and/or utilize multiple counters. In this way, if lazy loading technologies are utilized by websites or web application for subsequent datasets, the system may track the subsequent lazy loading without losing track of the last position of the original data and/or intervening datasets.

Embodiments of the system may also adapt a number of items loaded each time based on context information (location/bandwidth/item type) to improve the user experience by reducing the loading wait time. For example, if a bandwidth is high, thus allowing fast throughput, the system can increase the number of items to load each time and minimize loading response time. The system can also adapt this behavior dynamically to adapt to bandwidth performance changes. Similarly, the system can code content type of items to indicate whether it contains rich data items or just textual data items, and then based on this information, the system can adapt the number of items to retrieve to maximize throughput per load and minimize response time.

Embodiments of the system may also enable a cursor (e.g., a mouse cursor) to jump with or without the scroll bar. That is, once the mouse cursor jumps, the user does not need to reposition the mouse cursor to continue scrolling. The amount of cursor jumping can be proportional to new lazy loading counter increases.

Figure 5:
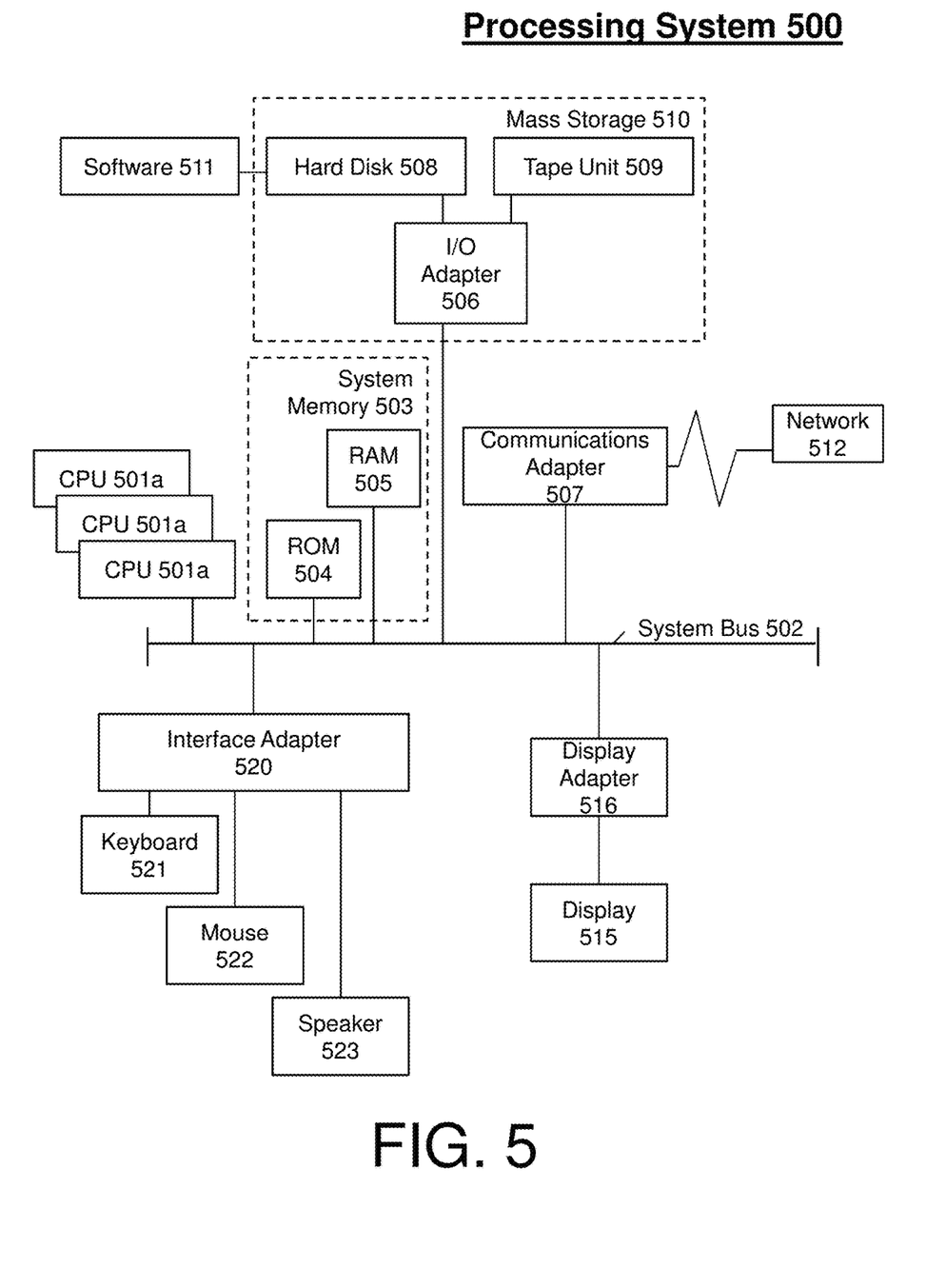
FIG. 5 illustrates a computing device schematic configured to provide efficient back browsing according to one embodiment.

Referring now to FIG. 5, there is shown an embodiment of a processing system 500 for implementing the teachings herein. In this embodiment, the processing system 500 has one or more central processing units (processors) 501a, 501b, 501c, etc. (collectively or generically referred to as processor(s) 501). The processors 501, also referred to as processing circuits, are coupled via a system bus 502 to system memory 503 and various other components. The system memory 503 can include read only memory (ROM) 504 and random access memory (RAM) 505. The ROM 504 is coupled to system bus 502 and may include a basic input/output system (BIOS), which controls certain basic functions of the processing system 500. RAM is read-write memory coupled to system bus 502 for use by processors 501.

FIG. 5 further depicts an input/output (I/O) adapter 506 and a network adapter 507 coupled to the system bus 502. I/O adapter 506 may be a small computer system interface (SCSI) adapter that communicates with a hard disk 508 and/or tape storage drive 509 or any other similar component. I/O adapter 506, hard disk 508, and tape storage drive 509 are collectively referred to herein as mass storage 510. Software 511 for execution on processing system 500 may be stored in mass storage 510. The mass storage 510 is an example of a tangible storage medium readable by the processors 501, where the software 511 is stored as instructions for execution by the processors 501 to perform a method, such as the process flows of FIGS. 1, 3-4. Network adapter 507 interconnects system bus 502 with an outside network 512 enabling processing system 500 to communicate with other such systems. A screen (e.g., a display monitor) 515 is connected to system bus 502 by display adapter 516, which may include a graphics controller to improve the performance of graphics intensive applications and a video controller. In one embodiment, adapters 506, 507, and 516 may be connected to one or more I/O buses that are connected to system bus 502 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 502 via an interface adapter 520 and the display adapter 516. A keyboard 521, mouse 522, and speaker 523 can be interconnected to system bus 502 via interface adapter 520, which may include, for example, a Super I/O chip integrating multiple device adapters into a single integrated circuit.

Thus, as configured in FIG. 5, processing system 505 includes processing capability in the form of processors 501, and, storage capability including system memory 503 and mass storage 510, input means such as keyboard 521 and mouse 522, and output capability including speaker 523 and display 515. In one embodiment, a portion of system memory 503 and mass storage 510 collectively store an operating system, such as the z/OS or AIX operating system from IBM Corporation, to coordinate the functions of the various components shown in FIG. 5.

Technical effects and benefits include a service that maintains a load count for lazy loading to provide more control to users when they want to return to a previous location on browser-back or application-back operations. Further, the Technical effects and benefits include providing by the system an impression to the user that the system remembered where the users have left off and doesn't require the users to do additional manual lazy loading. In this way, for example, the browser and the operations of the social network website that utilizes lazy loading technology are improved by the system. Further, the utilization by the system of the counter, which in turn, enables the user to avoid repeating their scrolling actions to arrive at the selected element and spares the user of the frustrations that normally accompany such repetitive actions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for enhancing a lazy loading operation, comprising:
   retrieving, by a processor, a plurality of subsets of a dataset via the lazy loading operation, wherein the dataset is presented by the processor through a browser of web application;
   incrementing, by the processor, a counter for each of the plurality of subsets retrieved by the processor;
   detecting, by the processor, a first event that navigates away from the retrieving of the plurality of subsets;
   detecting, by the processor, a second event that navigates back to the retrieving of the plurality of subsets;
   returning, by the processor, to the retrieving of the plurality of subsets in accordance with the counter in response to the detecting of the second event:
   retrieving a value of the counter in response to the detecting of the second event; and
   returning to a position that corresponds to an element that upon selection caused the first event, wherein the retrieving the plurality of subsets is a lazy loading operation that pulls each subset in batch form based on the counter value.

2. The method of claim 1, further comprising:
   returning to the position that corresponds to the element after returning to the retrieving of the plurality of subsets.

3. The method of claim 1, further comprising:
   returning to the position that corresponds to the element upon returning to the retrieving of the plurality of subsets; and
   performing background retrieving of the plurality of subsets.

4. The method of claim 1, further comprising:
   displaying an indication of the retrieving of the plurality of subsets.

5. The method of claim 1, further comprising:
   adjusting a size of each subset based on the counter and a rate of transfer of the retrieving of the plurality of subsets.

* * * * *